No. 845,870. PATENTED MAR. 5, 1907.
A. T. HEDFELDT.
CLEANING AND SEPARATING MACHINE.
APPLICATION FILED NOV. 28, 1904.

2 SHEETS—SHEET 1.

Fig. 1.

Witnesses.
Edward T. Wray.
Homer L. Kraft.

Inventor.
Axel T. Hedfeldt.
by Parker Carter
Attorneys.

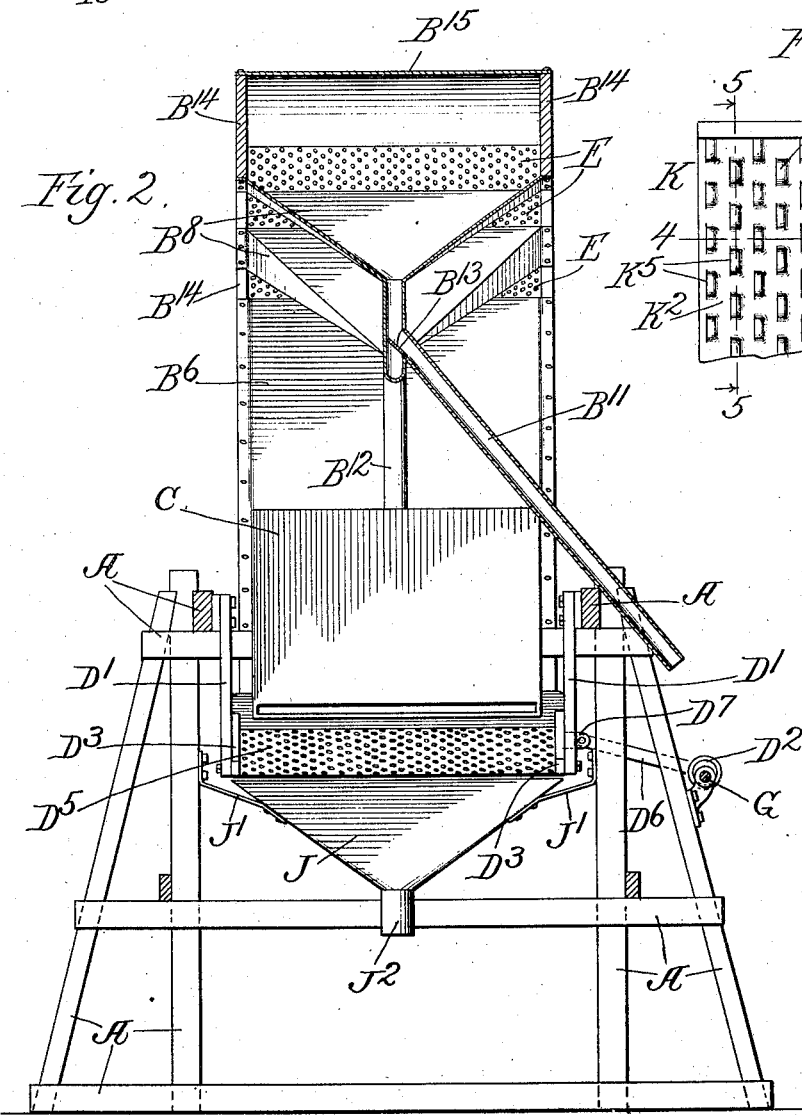

UNITED STATES PATENT OFFICE.

AXEL T. HEDFELDT, OF CHICAGO, ILLINOIS, ASSIGNOR TO HEDFELDT COMPANY, A CORPORATION OF ILLINOIS.

CLEANING AND SEPARATING MACHINE.

No. 845,870.  Specification of Letters Patent.  Patented March 5, 1907.

Application filed November 28, 1904. Serial No. 234,479.

*To all whom it may concern:*

Be it known that I, AXEL T. HEDFELDT, a citizen of the United States, residing at Chicago, in the county of Cook and State of Illinois, have invented a certain new and useful Improvement in Cleaning and Separating Machines, of which the following is a specification.

My invention relates to machines for cleaning and sorting granular material, and in particular to such machines adapted to be used in the handling of coffee.

As is well known, coffee-beans when imported are very apt to be mixed with impurities of all sorts, such as stones, dirt, husks, &c. The value of the commercial product depends, of course, upon the exclusion from the coffee of this extraneous matter and also upon the proper sorting of the coffee-berries themselves. The good sound berries are in practice found mixed with berries of lighter weight, and consequently a poorer quality, and also with "blights," which are dry dead berries of no value, and another kind called "blacks," which are small and heavy and bitter to the taste. The sorting of coffee-berries is therefore a very important matter as well as a very difficult matter, a high grade of coffee being obtainable only when the sound full-grown berries can be separated from all the rest. This has been proven a very difficult matter to accomplish, as the ordinary fanning-mill will not accomplish the result sought for on account of the variety of conditions to be dealt with. In my machine by means of the force of an air-blast confined within a chute of somewhat peculiar construction coöperating with the force of gravity I am able to accomplish a more complete cleansing and grading of the coffee than has heretofore been possible.

I have illustrated one form of my machine in which my invention may be embodied in the accompanying drawings. I desire the drawings, however, to be taken as in a sense diagrammatic, for while they show one practical form of my machine it will be clear that this particular form might be greatly changed without a departure from the scope of my invention.

In the drawings, Figure 1 is a longitudinal section through the machine; Fig. 2, a cross-section on line 2 2 of Fig. 1; Fig. 3, a plan view of a part of the pea-berry screen; Fig. 4, a section on line 4 4 of Fig. 3, and Fig. 5 a sectional view on line 5 5 of Fig. 3.

Like letters indicate like parts in all the drawings.

In order to support the operating elements of my machine, I construct a framework A of any desired form. On this framework is suitably supported an air chute or shaft B, which is preferably curved in the manner shown and may be provided at the lower end with a narrowed neck part B' and at the other end may be curved over and downwardly and provided with the spout or outlet-pipe $B^2$. The chute has a series of openings through which the material sorted falls from the chute into its proper receptacles. The lowermost of these openings $B^3$, which is just beyond the narrowed portion B' of the chute, has connection there with the spout $B^4$. The next three openings $B^5$ $B^5$ $B^5$ I have shown as discharging into an inclined trough $B^6$. Beyond these openings $B^5$, I have shown three more $B^7$ $B^7$ $B^7$, and with these are associated the spouts $B^8$ $B^8$ $B^8$, and further removed up the chute another opening $B^9$ with the spout $B^{10}$. Each of the spouts $B^8$ is provided with the pipes $B^{11}$, which may lead to a receptacle, (not here shown,) and the pipe $B^{11}$ has in each case a branch pipe $B^{12}$, leading to the hopper C, the opening thereto being controlled by the valve $B^{13}$. This arrangement of outlets is quite arbitrary and may be varied at will. In practice the heaviest material—for example, stones—will be carried off through the pipe $B^4$, while the next three openings $B^5$ $B^5$ $B^5$ will serve to deposit the heavy sound berries, while the openings $B^7$ $B^7$ $B^7$ and $B^9$ will receive berries of successively lighter weight.

In order to provide for adjustment, as it were, in the sorting, the openings $B^7$ each have their separate outlet-pipes and are also connected with the same receptacle—namely, the screen D—upon which the highest grade of berries are adapted to be delivered. While this arrangement is considered a desirable one, it is not at all essential to my invention. It is quite possible that under certain circumstances it would be advisable that the outlets $B^5$ might each have a separate spout, so as to operate independently.

For the purpose of making a finer graduation of the granular material than would be possible merely through the agency of the force of gravity I interrupt the blast of air at a succession of points along the under side of the shaft, so that the draft will be alternately concentrated and diffused. This is accomplished by means of the inwardly-projecting parts E E, which may be considered as forming the under wall of the chute between the successive discharge-apertures. Preferably I make these parts of perforated material, as wire-screening or the like, so as to permit the blast of air to be gradually diminished as it proceeds through the chute. This, however, is not essential, and while I have shown all of these inwardly-projecting parts as composed of perforated material they might any or all be constructed solid, if desired. When constructed of screens, as I prefer to make my machine, the lower side of the chute will be composed of a series of spouts and between the spouts pairs or mutually-inclined screens extending in toward the upper side of the chute. The particular conformation of the under side of the chute is not essential; but I prefer to give it the form shown, as that is particularly well adapted for intercepting and carrying off the material as it is precipitated from the air-blast.

The material to be cleaned may be introduced into the chute in any desired manner. I have here shown a screen F slightly inclined from the vertical and supported in proximity to the opening in the lower end of the chute by means of flexible hangers F'. This screen may be connected with a rotated shaft G by means of an eccentric $F^2$, so that it may be oscillated from side to side, and it preferably discharges at its lower end into the spout $F^3$. The air-blast discharges into the chute from below the screen F through any suitable inlet, as shown at H, the fan or other source of supply being not shown herein. The inlet H, I prefer to provide with an automatic governor, by means of which the draft may be kept constant. To this end the inlet H has an aperture H', covered by the valve $H^2$, hinged at $H^3$, so as to swing outwardly, and provided with an arm $H^4$ upon which is the weight $H^5$.

The screen D is meant to receive a certain amount of the product sorted. The trough $B^6$, I have shown as discharging upon this screen, and also the hopper C, into which the product through any or all of the discharge-apertures $B^7$ $B^7$ $B^7$ may be carried by a proper arrangement of the valves $B^{13}$. If desired, of course, only such material as is discharged through the openings $B^5$ will be carried onto the screen D, the rest of the material being discharged into separate receptacles.

by means of which the further graduation of the coffee-berries is brought about. The screen D is preferably supported over a hopper J on an inclined plane by means of flexible hangers D' D' and is connected by an eccentric $D^2$ with the shaft G, so that it will be vibrated back and forth. During this process the small black beans, which are commonly called "blacks," will be sifted out and pass downward through the spout J. This screen is, in effect, a sieve, being formed of the side pieces $D^3$, a back strip $D^4$, and a perforated bottom $D^5$, the perforations of which are just large enough to allow the small round blacks or other like matter to pass through them.

From the screen D the coffee-berries pass on to another screen K, composed of the side pieces K' and a perforated bottom piece of peculiar construction, as shown at $K^2$. This screen is also inclined somewhat from the horizontal and is supported by hangers $K^3$ $K^3$ and may also be oscillated by means of the eccentric $K^4$ on the shaft G. By means of this screen the round or pea berries are separated from the flat berries. This separation is effected by the peculiar construction of the bottom of the screen, detail representations of which are shown in Figs. 3, 4, and 5. As here shown, the screen is formed of a diaphragm of sheet metal, in which are a plurality of transverse slits $K^5$ $K^5$, placed in a staggered arrangement. The material around these slits is struck up from the plane of the diaphragm in the manner shown at $K^6$ $K^6$ in the sectional views of Figs. 4 and 5 and to a height sufficient to admit the flat berries into the apertures $K^7$ $K^7$ formed thereby, but not high enough to admit the round or pea berries. The flat berries therefore pass down through the screen and are discharged into a receptacle through the discharge-spout L' of the hopper L, while the pea-berries work their way between the upward projections of the screen and are finally discharged into the spout $K^8$. It will be clear that the precise construction of this screen might be considerably varied without a departure from the scope of my invention—as, for example, the screen might be made by indenting the material of the diaphragm in front of the slits or openings instead of raising it behind such openings. In either event the operation would be precisely the same, and other such changes would doubtless be possible.

In Fig. 2 I have shown the means by which the screen D is supported. These consist in the hangers D' D', which are preferably of somewhat flexible metal and are rigidly secured at one end to the framework A and at the other to the side pieces of the screen.

through the connecting-link $D^6$, which is pivoted to the lug $D^7$ on one of the side pieces $D^3$. This arrangement is also common to all the screens. The hopper J is supported to the frame A by means of the brackets J' J' and has the discharge-spout $J^2$. The screen K is supported over a like hopper L, having the spout L'. The chute B, it will be understood, may be constructed in any desired form or of any preferred material—as, for example, wood or sheet metal. It may be formed of the two side strips $B^{14}$ $B^{14}$, with the covering $B^{15}$, which I prefer to make curved, as shown.

I have described with some detail one form of my device; but it will be obvious that the particular forms and constructions might be considerably varied without departing from the broad spirit of my invention, and therefore I do not wish to limit myself to the particular devices and forms of apparatus here shown.

In describing the operation of the machine I have had particular reference to its use in the sorting and cleaning of coffee, as my machine is particularly adapted for handling this material, and, further, because the coffee is one of the most difficult of materials to clean and grade. It will be obvious, however, that the machine is equally well adapted for handling materials of other kinds where similar conditions are met with and similar obstacles have to be overcome. Therefore it will be understood that I do not limit myself to the particular use nor to the details of construction made necessary by the particular adaptation shown.

The use and operation of my machine are as follows:

The granular materials—as, for example, the coffee-berries—are fed onto the screen F in any desired manner and are spread out into a thin layer by the slight shaking motion of the screen. As they reach the place where the air-blast passes through the screen they are carried upward by the blast through the chute, together with whatever foreign material they may be mixed. If there is any very heavy materials mixed with the coffee, such as stones of considerable size, they will pass over the screen unaffected by the blast and will fall into the spout $F^3$. The mass of the material, however, is carried upward through the chute and will be deposited through the successive discharge-apertures along the under side of the chute at altitudes varying inversely to the different specific gravities of such material. The heaviest, such as gravel and the like, will be precipitated first and will fall down through the spout $B^3$. Next in weight will be the sound full-grown berries, and these will be deposited through the discharge-apertures $D^5$ and will constitute the coffee of the finest grade. If very close graduation of the material is not sought for, the material precipitated into any or all of the discharge-apertures $D^7$ may also be mingled with that of the heavier and higher grade material. Normally, however, the several discharge-apertures $B^7$ and the aperture $B^9$ will be used independently, so as to effect a fine graduation of the materials treated. The waste material—such as chaff, straw, and husks—will be carried off through the pipe $B^2$.

In the process of sorting the materials treated several agencies coöperate to produce the desired effect, although it will not be necessary in all cases to utilize all of such agencies. Primarily the sorting is effected by means of the force of gravity against the upwardly-directed force of the air-blast, precipitation of the material taking place at altitudes inversely proportioned to the weight of the material at a succession of points, as the gradually-diminishing force of the air-blast exerted on the material is counterbalanced by the constant force of gravity. In order to facilitate this action, I prefer to incline my chute from the vertical, and also to form it with a curved upper surface. The current of air will therefore be concentrated, as it were, along this curved surface, and with it the mass of the material. The draft through the rest of the chute will of course be proportionately weakened, and therefore as soon as a coffee-berry, for example, is drawn slightly out of the main current of the force of gravity it will immediately be precipitated downward. Because of the inclination of the chute the material will fall with exactness through one or the other of the discharge-apertures, according to weight.

A second agency in the accomplishment of my purpose is the alternate narrowing and widening of the chute by means of which the blast therethrough is alternately condensed and diffused—that is, its rate of speed increased and then slackened. With the diffusion of the current precipitation of the heavier materials it contains will take place, and this diffusion occurs successively above each of the discharge-apertures.

To increase the precipitation at certain points, I may also construct my machine so that the air-blast is gradually diminished by allowing the air to escape at successive points along the chute. This is accomplished by means of perforating the inwardly-projecting parts E E. I do not consider this construction absolutely essential. It is not necessary, as I have said, that all three of the agencies I have just mentioned should coöperate in each case to get the result desired.

The further sorting of the granular material—that is, that which cannot be made dependent upon the specific gravity—is effected by means of the screens D and K in the manner described.

It will be observed that the screens E E when used do not interfere with the draft of air along the curved surface at the top of the chute. These projecting parts are, in fact, not essential in all cases, although they are useful, as above stated, and also for the purpose of guiding the falling material into the proper discharge-openings. The blast of air will of course be diminished as it proceeds up the chute, even if no air were allowed to escape, and its propelling force upon the materials will be gradually overcome by the force of gravity. The draft will always be concentrated along the curved surface, holding the particles in suspension close to such surface, so long as the force of the draft is sufficient to propel them. The current of air will, in fact, be deflected from point to point along the upper side of the chute.

I claim—

1. In a device for cleaning and sorting granular materials, the combination of a relatively narrow chute curved or bowed from the vertical, having a series of inclined inwardly-projecting screens along the under side thereof, discharge-apertures associated with such screens, means for introducing the material to be sorted into the chute at its lower end, and a device for discharging a blast of air into such chute through its lower end.

2. In a machine for sorting and cleaning granular materials, the combination of a curved air-chute, the upper wall of which forms an uninterrupted continuously-curved surface, means for discharging a blast of air upward into the chute at its lower end, a device for introducing the material to be sorted at the lower end of the chute, a series of discharge-apertures therealong and on each side thereof perforated portions of the under wall of the chute so conformed as to jut in toward the center of the chute and thereby obstruct the falling material and conduct the same to the apertures.

3. In a device for cleaning and sorting granular materials, the combination of a relatively narrow chute curved or bowed from the vertical having a series of inclined inwardly-projecting members along the under side of the curved part thereof, discharge-apertures associated with such members, means for introducing the material to be sorted into the chute at its lower end, and a device for discharging a blast of air into such chute at the lower end thereof.

4. In a machine for sorting and cleaning granular material, an air-chute comprising an upwardly and outwardly curved wall forming an uninterrupted continuously-curved surface in combination with a device for discharging a blast of air along such surface from the lower end of the chute, a series of discharge devices under such curved wall for discharging the material from the chute and means for introducing the material to be sorted into such chute so as to be carried upward by such air-blast.

5. In a machine for sorting and cleaning granular material, an air-chute comprising an upwardly and outwardly curved wall forming an uninterrupted continuously-curved surface and a lower wall beneath such curved surface having a series of inward projections and apertures between such projections, in combination with a device for generating a draft of air along such surface, and means for introducing the material to be sorted into such chute so as to be carried upward by such air-blast.

6. In a machine for sorting and cleaning granular material, the combination of a relatively narrow and extended inclined air-chute having its upper wall curved so as to form a continuous uninterrupted bowed surface and its lower wall interrupted by inward projections and discharge-apertures, a device for discharging a blast of air through such chute from the lower end thereof, and means for introducing the material to be sorted into such chute so as to be carried upward by the air-blast.

7. In a machine for sorting and cleaning granular material, the combination of a continuously-curved relatively narrow air-chute, having discharge-apertures along its under side, with means for disposing the material to be treated in a relatively thin layer transverse to the axis of the chute so as to be carried therethrough, and an air-blast device discharging through such layer of material and into such air-chute.

8. In a machine for sorting and cleaning granular materials, the combination of a curved or bowed chute having discharge-apertures along its under side, with an air-blast device discharging through the chute from the lower end, and means for disposing the material to be treated above such air-blast device and in a relatively thin layer transverse to the direction of the air-blast.

9. In a machine for sorting and cleaning granular materials, the combination of an air-chute comprising a curved or bowed wall, with a device for generating a draft of air along the under or concave side of such bowed wall, means for disposing the material so as to be carried upward by such draft of air, and a series of discharge devices located under said bowed wall and adapted to receive the material as the draft along said wall becomes diminished.

10. In a device for sorting and separating materials, the combination of a bowed or curved wall, means for disposing the material to be treated near to said wall, an air-blast device adapted to discharge through the material so as to carry it upward along and against said wall, and means for collecting said material at different points along and under the wall.

11. In a device for sorting and separating materials, the combination of a bowed or curved wall, means for disposing the material in a relatively thin sheet or film near to said wall, an air-blast device adapted to discharge through the material so as to carry it upward along and against said wall, and means for collecting said material at different points along and under the wall.

AXEL T. HEDFELDT.

Witnesses:
 EDWARD T. WRAY,
 PERCIVAL A. TRUMAN.